US007416087B2

(12) United States Patent
Press

(10) Patent No.: US 7,416,087 B2
(45) Date of Patent: Aug. 26, 2008

(54) INTERIORLY DISPOSED FILTER FOR PORTABLE FUEL CONTAINER

(75) Inventor: Dan Press, Vader, WA (US)

(73) Assignee: Kim Sieckmann, Gladstone, OR (US)

( * ) Notice: Subject to any disclaimer, the term of this patent is extended or adjusted under 35 U.S.C. 154(b) by 79 days.

(21) Appl. No.: 11/250,785

(22) Filed: Oct. 13, 2005
(Under 37 CFR 1.47)

(65) Prior Publication Data

US 2006/0081652 A1 Apr. 20, 2006

Related U.S. Application Data

(60) Provisional application No. 60/619,639, filed on Oct. 17, 2004.

(51) Int. Cl.
*B01D 29/88* (2006.01)
*B67D 5/58* (2006.01)
*B67D 5/00* (2006.01)

(52) U.S. Cl. ....................... 210/466; 210/467; 210/473; 210/244; 222/189.06; 222/189.07

(58) Field of Classification Search ....................... None
See application file for complete search history.

(56) References Cited

U.S. PATENT DOCUMENTS

| | | | | | |
|---|---|---|---|---|---|
| 242,962 | A | * | 6/1881 | Newton | 222/189.07 |
| 596,369 | A | * | 12/1897 | Jackson | 222/189.07 |
| 817,452 | A | * | 4/1906 | Skinner | 222/189.07 |
| 2,370,668 | A | | 3/1945 | Johnson | |
| 2,490,443 | A | | 12/1949 | Knipper | |
| 2,723,056 | A | * | 11/1955 | Smith | 222/396 |
| 2,877,903 | A | | 3/1959 | Veres | |
| 3,460,680 | A | | 8/1969 | Domnick | |
| 3,546,853 | A | | 12/1970 | Claar | |
| 4,075,099 | A | | 2/1978 | Pelton et al. | |
| 4,595,130 | A | * | 6/1986 | Berney | 222/189.06 |
| 4,853,125 | A | | 8/1989 | Hanabusa | |
| 5,545,315 | A | * | 8/1996 | Lonneman | 210/120 |
| D391,448 | S | * | 3/1998 | Winer et al. | D7/510 |
| 5,799,836 | A | | 9/1998 | Lee | |
| 5,980,759 | A | * | 11/1999 | Proulx et al. | 210/767 |
| 6,068,163 | A | * | 5/2000 | Kihm | 222/189.1 |
| 6,136,189 | A | * | 10/2000 | Smith et al. | 210/266 |
| 6,165,362 | A | * | 12/2000 | Nohren et al. | 210/472 |
| 6,423,226 | B1 | * | 7/2002 | Hopkins et al. | 210/321.86 |
| 7,240,809 | B2 | * | 7/2007 | Godfrey | 222/189.07 |
| 2002/0036176 | A1 | | 3/2002 | Hughes et al. | |
| 2004/0118761 | A1 | | 6/2004 | Yates | |

* cited by examiner

*Primary Examiner*—Krishnan S. Menon
*Assistant Examiner*—Madeline Gonzalez
(74) *Attorney, Agent, or Firm*—Klarquist Sparkman, LLP

(57) ABSTRACT

The present disclosure concerns a fuel filter assembly that can be easily installed on a portable fuel container, such as a race fuel jug or utility jug. The assembly includes a fuel filter positioned in the fuel container to filter fuel that is being poured or otherwise discharged from the container. The fuel filter desirably is selected to filter dirt and other particulate matter that can clog the carburetor or cause damage to other engine parts.

8 Claims, 1 Drawing Sheet

INTERIORLY DISPOSED FILTER FOR PORTABLE FUEL CONTAINER

CROSS-REFERENCE TO RELATED APPLICATION

This application claims the benefit of U.S. Provisional Application No. 60/619,639, filed on Oct. 17, 2004, which is incorporated herein by reference.

FIELD

The present invention concerns embodiments of an interiorly disposed filter for a portable fuel container, such as race fuel jug.

BACKGROUND

Portable fuel containers, known as race fuel jugs or utility jugs, are used to supply gasoline to vehicles, such as snowmobiles, racecars, motorcycles, snowmobiles, ATVs, etc., or other gasoline-engine driven devices, such as lawnmowers. In some cases, the vehicle or engine-driven device may not have a fuel filter for filtering gasoline entering the engine. After repeated emptying and re-filling of a fuel jug, dirt and other particulate matter can collect in the jug. When fuel contaminated with particulate matter is supplied to a vehicle that does not have a fuel filter, various performance and maintenance issues can result. For example, the carburetor can become clogged, resulting in a "lean" condition where the engine runs hotter than usual. Unfortunately, this can cause serious damage to the pistons and other engine parts.

SUMMARY

The present application discloses a fuel filter assembly that can be easily installed on a portable fuel container. The assembly includes a fuel filter positioned in the fuel container to filter fuel that is being poured or otherwise discharged from the container. The fuel filter desirably is selected to filter dirt and other particulate matter that can clog the carburetor or cause damage to other engine parts.

In certain embodiments, the filter includes a filter body sized and shaped to fit inside the fuel container and an outlet spout extending from the filter body. The filter body can include a pleaded, generally cylindrical mesh screen (e.g., a 100-micron mesh screen) for filtering particulate matter from the fuel. The outlet spout is formed with external threads adapted to threadably engage an opening in the removable cap of the container. Thus, when the filter is secured to cap and the cap is placed on the container, the filter body resides inside the container and filters fuel as it flows outwardly from the container. The outlet spout in particular embodiments is sized such that an exposed end portion extends past the opening in the cap. This allows a coupling for a discharge conduit (e.g., a flexible hose or tube) to be screwed onto the exposed end portion of the outlet spout. The coupling can include a hose-barb type connection for securing the discharge conduit.

When the container is being used to store fuel, the coupling for the discharge conduit can be removed from the outlet spout and a removable cap can be screwed onto the outlet spout to prevent accidental spillage from the container.

The foregoing and other features and advantages of the invention will become more apparent from the following detailed description of several embodiments, which proceeds with reference to the accompanying figures.

DETAILED DESCRIPTION

As used herein, the singular forms "a," "an," and "the" refer to one or more than one, unless the context clearly dictates otherwise.

As used herein, the term "includes" means "comprises." Referring to the figures, there is shown a portable fuel container 10 on which there is mounted a fuel filter assembly 12 for filtering fuel that is dispensed from the container, according to one embodiment. In particular embodiments, the fuel container 10 can be a conventional race fuel jug (also known as utility jugs), which typically is sized to hold about 2.5 or 5 gallons of fuel, although larger or smaller jugs also can be used. Also, in alternative embodiments, the fuel filter assembly 12 can be used with other types of fuel containers.

Figure 2:
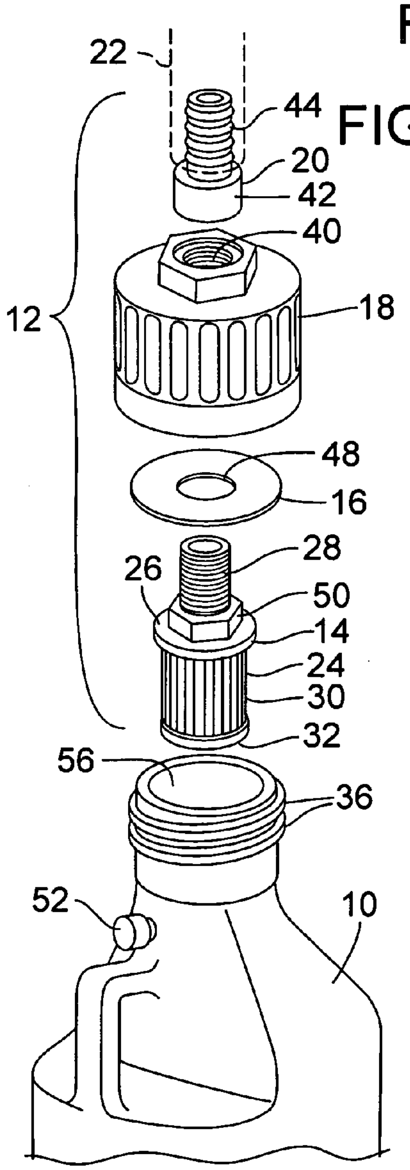
FIG. 2 is a perspective, exploded view of the fuel container and the fuel filter assembly of FIG. 1.
Figure 3:
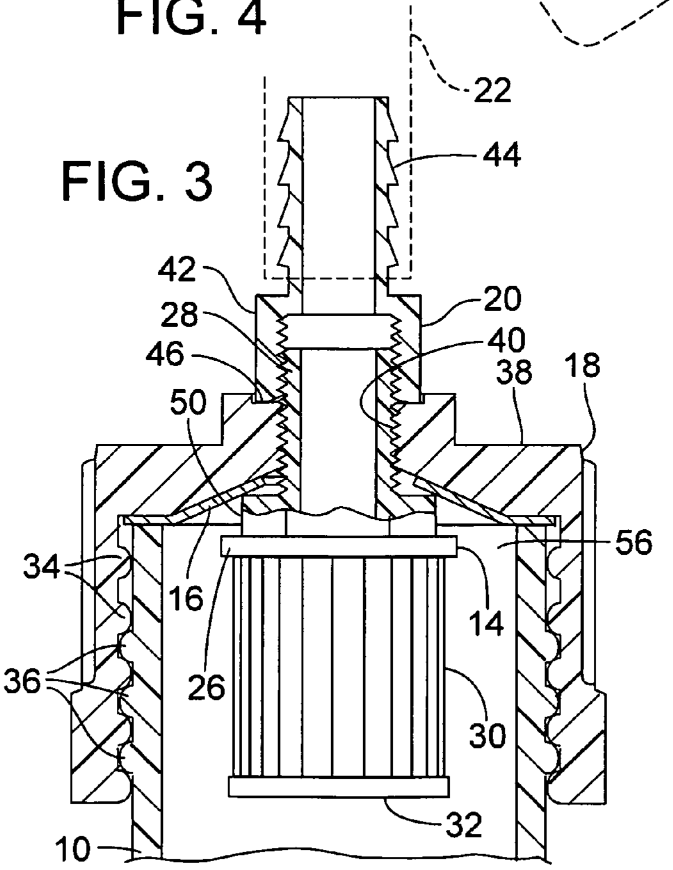
FIG. 3 is a vertical, cross-sectional view of the fuel filter assembly and the neck of the fuel container of FIG. 1.

As best shown in FIGS. 2 and 3, the fuel filter assembly 12 in the illustrated embodiment comprises a filter 14, an optional sealing member 16, a removable container cap, or closure, 18 for covering the opening 56 of the container, a discharge-conduit coupling 20, and a discharge conduit 22. The illustrated filter 14 includes a filter body, or filter element, 24, an end cap 26 mounted to the top of the filter element 24, and an externally threaded outlet port 28 (also referred to herein as a connecting member) for connecting the filter to the container cap 18.

The filter element 24 can have any construction suitable for filtering fuel. In the illustrated configuration, for example, the filter element 24 has a generally cylindrical, pleaded mesh screen 30 and a solid end cap 32 that is secured to the end of the filter element 24 opposite the end cap 26. In one specific embodiment, the mesh screen 30 is a 100-micron mesh screen, although other mesh sizes also can be used. The filter element 24 also can include an internal perforated cylinder (not shown) for supporting the mesh screen 30. The mesh screen 30 and the internal cylinder can be made of metal (e.g., steel, aluminum, etc.) or any of various other suitable materials.

In alternative embodiments, the filter element can include various types of filter media. For example, in lieu of or in additional to the mesh screen 30, the filter element can include a fibrous filter element or any of various absorbent filter materials.

The filter 14 is sized and shaped to fit within the neck of the container 10. The outlet port 28 is in fluid communication with the filter element 24 (as shown in FIG. 3). Thus, when fuel is dispensed from the container, unfiltered fuel flows radially inwardly through the mesh screen 30 and filtered fuel flows outwardly through the outlet port 28 in the axial direction.

The container cap 18 can be the cap of a conventional race fuel jug. As shown in FIG. 3, the cap 18 is formed with internal threads 34 that engage the threads 36 on the neck of the container when the cap is screwed onto the container. The top wall 38 of the cap 18 is formed with a centrally disposed opening 40. The opening 40 desirably is internally threaded to engage the outlet port 28 of the filter 14. In this manner, the filter 14 can be easily installed or removed from the cap 18 by simply screwing or unscrewing the filter 14, such as for cleaning or replacing the filter.

As further shown in FIG. 3, the discharge-conduit coupling 20 in the illustrated embodiment includes an internally threaded, first end portion 42 and a second end portion 44 comprising a hose-bard type connector. The outlet port 28 is dimensioned such that an exposed end portion of the outlet port extends beyond the opening 40 in the container cap 18. This allows the first end portion 42 of the coupling 20 to be screwed onto the exposed end portion of the outlet port 28. The top surface of the container cap 18 can be formed with an annular recess 46 that receives the bottom end of the coupling 20. In a particular embodiment, the discharge-hose coupling comprises a standard size hose-bard fitting having a ¾ inch threaded end portion and a ¾ inch hose-bard end portion. In the latter embodiment, the outer diameter of the threaded end portion (the first end portion 42 in the illustrated embodiment) can be reduced, such as by machining the outer surface, so that it can fit more easily into the annular recess 46.

The discharge conduit 22 can be, for example, a flexible hose or tube, which can be connected to coupling 20 by inserting the hose-bard end 44 into one end of the hose. The hose-bard end 44 frictionally engages the inner surface of the hose to secure the hose to the coupling. In other embodiments, the discharge conduit can be non-flexible or rigid tubing or piping. Additionally, the discharge conduit and/or the coupling 20 can have other forms. In one implementation, for example, the discharge conduit can be connected to a coupling by a threaded connection (e.g., the conduit can be provided with a threaded end portion that screws onto a threaded end portion of the coupling). In another implementation, the second end 44 of the coupling 20 can have relatively smooth outer surface (without hose barbs), in which case a conventional hose clamp can be used to connect the discharge conduit to the second end of the coupling.

The filter and/or the discharge-conduit coupling can be configured to mount to the container cap using other techniques or mechanisms. In one implementation, for example, the filter can be provided with a non-threaded outlet spout and the container cap can be provided with a non-threaded opening, with outlet spout being configured to be inserted into and form a frictional fit with the cap opening. In another implementation, the discharge-conduit coupling can be configured to be mounted directly to the container cap, rather than the outlet spout 28 as shown, such as by a threaded connection.

As shown in FIGS. 2 and 3, the sealing member 16 in the illustrated embodiment is an annular gasket formed with a central opening 48 sized to receive the outlet spout 28 of the filter 14. As shown in FIG. 3, the sealing member is sized and shaped such that an annular outer peripheral edge is disposed and forms a liquid-tight seal between the top edge of the container opening and an adjacent inner surface of the container cap 18. An annular inner peripheral edge of the sealing member 16 is disposed and forms a liquid-tight seal between a raised portion 50 of the filter 14 and an adjacent inner surface of the container cap 18. The sealing member 16 desirably is made of a resilient or elastomeric material that is compatible with the liquid stored in the container. For example, the sealing member can be of Teflon®, rubber, or any of various other suitable materials.

In an alternative embodiment, the filter can be permanently attached to the container cap. For example, the container cap and the filter outlet spout can be molded as a unitary piece. Similarly, the discharge-conduit coupling can be permanently attached to the container cap or the filter outlet spout, such as by molding the container cap, the discharge-conduit coupling, and the outlet spout of the filter as a unitary piece.

Figure 1:
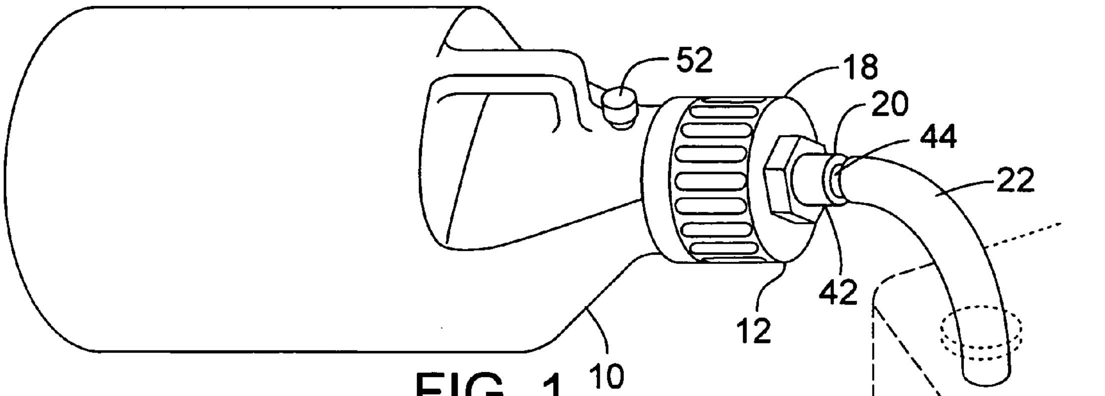
FIG. 1 illustrates a portable fuel container having a fuel filter assembly, according to one embodiment, being used to supply fuel to the fuel tank of a vehicle.

In use, the end of the discharge conduit 22 can be placed in the opening of a gas tank 54 (shown schematically in FIG. 1), which can be the gas tank of a vehicle, such as a racecar or other gasoline-engine driven device. Fuel in the container 10 can then be gravity fed into the gas tank 54. As noted above, fuel flowing outwardly from the container is filtered by the filter 14. The container 10 can have a vent cap 52 as shown in FIGS. 1 and 2, which can be removed to facilitate the flow of fuel into the tank.

Figure 4:
FIG. 4 is a perspective view of a cap that can be attached to the end of the filter outlet spout when the coupling for the discharge conduit is removed from the outlet spout.

When not being used for supplying fuel to a gas tank, the discharge-conduit coupling 20 and the discharge conduit 20 can be removed from the container cap 18. An internally threaded cap 58 (FIG. 4) can be screwed onto the exposed upper end portion of the outlet spout 28 to prevent accidental spillage from the container. Alternatively, the outlet spout 28 can be partially unscrewed from the cap opening 40 such that the outlet spout does not extend beyond the cap opening and a few of the threads in the cap opening are exposed. An externally threaded plug or cap (not shown) can then screwed into the cap opening 40 to prevent spillage from the container. Still alternatively, a plug or cap (not shown) can be provided for attaching to and closing the free end of the discharge conduit 20.

The present invention has been shown in the described embodiments for illustrative purposes only. The present invention may be subject to many modifications and changes without departing from the spirit or essential characteristics thereof. I therefore claim as my invention all such modifications as come within the spirit and scope of the following claims.

I claim:

1. A method for supplying fuel to a fuel tank of an engine-driven device using a portable fuel container having a removable cap, the method comprising:

removing the cap from the container;

screwing a threaded outlet spout of a filter through an opening in the cap such that the filter is secured to the cap and an exposed end portion of the outlet spout extends beyond the cap opening;

screwing a hose coupling onto the exposed end portion of the outlet spout;

introducing fuel into the fuel container;

placing the cap onto the container such that a filter element of the filter is disposed in the container;

connecting a discharge hose to the hose coupling;

opening a vent in the container to allow atmospheric air to enter the container through the vent to facilitate the flow of the fuel from the container, and introducing fuel from the container into the fuel tank via the discharge hose such that the fuel flowing from the container is filtered by the filter element by inverting the container and allowing fuel in the container to flow under gravity through the filter and the discharge hose.

2. The method of claim 1, wherein the hose coupling comprises a first end portion and a second end portion, the first end portion comprising an internally threaded opening for threadably engaging the outlet spout of the filter and the second end portion comprises hose bard connector for securing the discharge hose.

3. The method of claim 2, further comprising machining an outer surface of the first end portion of the hose coupling so that the first end port ion extends into an annular recess in the container cap when the hose coupling is tightened onto the outlet spout of the filter.

4. The method of claim 1, wherein the container cap comprises a first cap and the method farther comprises removing the hose coupling and the discharge hose from the outlet spout of the filter and screwing a second cap onto the exposed end portion of the outlet spout to prevent spillage of fuel from the container.

5. The method of claim 1, wherein substantially all of the fuel in the container is fed into the fuel tank.

6. The method of claim 1, wherein the container is not pressurized while fuel flows under gravity through the filter and the discharge hose.

7. A portable fuel container assembly, comprising:

a fuel container having an opening for filling or removing fuel from the container, the container having an externally threaded neck portion, the container having a vent that, when opened, facilitates the flow of fuel from the container;

a removable container closure defining internal threads for threadably engaging the neck portion of the container, the closure also defining an internally threaded opening;

a filter comprising a filter body and an externally threaded connecting member mounted to the top of the filter element and adapted to be screwed into the opening of the closure to secure the filter to the closure, wherein the filter is sized to be inserted into the container such that when the closure is screwed onto the container, the filter body resides inside the container, wherein the connecting member is dimensioned such that an upper end portion of the connecting member extends beyond the closure opening when the connecting member is screwed into the closure opening, the connecting member also defining an internal passageway in fluid communication with the filter body to allow fuel to flow through the filter body and outwardly through the connecting member, wherein the filter body comprises a generally cylindrical mesh screen;

a discharge hose;

a hose-barb coupling having a first end portion and a second end portion, the first end portion defining an internally threaded opening adapted to threadably engage the upper end portion of the connecting member extending beyond the closure opening, the second end portion comprising a hose-barb connector adapted to secure one end of the discharge hose; and a sealing member sized and shaped to provide a liquid-tight seal between the container neck and the container closure and between a surface of the filter and an annular surface of the closure surrounding the closure opening;

wherein when the assembly is assembled with the container closure in the container, the filter mounted to the container closure, the hose-barb coupling connected to the connecting member, and the discharge hose connected to the hose-barb coupling, and the assembly is inverted, fuel can flow under gravity through the filter element, the connecting member of the filter, the discharge-conduit coupling, the discharge hose and into a fuel tank.

8. The portable fuel container assembly of claim 7, further comprising a removable cap adapted to threadably engage the upper end portion of the connecting member extending beyond the closure opening when the hose-barb coupling is removed from the connecting member.

* * * * *